Figure 1:
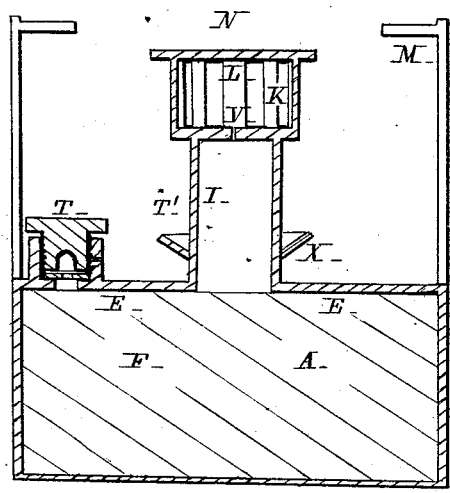

F. ROSENGREN.
Vapor-Burner for Cooking-Stoves.

No. 160,282. Patented March 2, 1875.

Witness:
W. Cochran,
F. M. Tate,

Inventor:
Frank Rosengren,
By Saml. J. Wallace,
Attorney.

UNITED STATES PATENT OFFICE.

FRANK ROSENGREN, OF CHICAGO, ILLINOIS.

IMPROVEMENT IN VAPOR-BURNERS FOR COOKING-STOVES.

Specification forming part of Letters Patent No. 160,282, dated March 2, 1875; application filed August 24, 1874.

*To all whom it may concern:*

Be it known that I, FRANK ROSENGREN, of Chicago, Cook county, Illinois, have invented a Lamp Cooking-Stove, of which the following is a specification:

This invention consists in an improved apparatus for light, heating, and cooking purposes, and burning liquid hydrocarbon fuel. It is made substantially as hereinafter set forth, referring to the drawings accompanying, in which—

Figure 1 is a vertical section of the apparatus.

The chamber A is arranged to hold the fuel in suitable liquid and volatile form, as the various suitable products of petroleum. This chamber is filled with fibrous matter in state of fine porous division, so as to be in contact with the top plate E of the chamber, and so as to keep the liquid in suspension against it, to be vaporized by heat conducted from the burner, to produce vapor for burning while any of the liquid remains. The tube I projects upward from chamber A, and has a jet-hole, V, on top, for escape of vapor under pressure for burning. The vapor from this strikes the plate L above it, and spreads to the sides, mixing with the air and burning to heat a vessel set at N on supports M, for cooking or other purpose. The heat from the plate L descends by the upright parts K and the walls of tube I to plate E, to vaporize the oil for burning in contact with it. To start action the cup $x$ is filled with alcohol, to burn and heat up the apparatus and produce vapor. The chamber A has a tubular hole for filling by. This is closed by screw-plug T, and has a rubber ring between bearings at the bottom of tube and the lower end of the plug, to form a tight packing. This tube has a hole in its side, part way up, which the plug closes when down. When the plug is partly unscrewed it opens this hole more or less, so vapor may escape by it. This reduces the vapor pressure in the chamber, and the quantity of vapor passing through jet V, and, consequently, the heat of plate L, and that carried down to produce vapor, lowering the quantity of heat applied to the vessel at N, so that by this means the fire is regulated. The plug T has a screw-thread engaging with one in filling-tube, and a projecting rim at top to turn it by. As it is screwed up and down it opens or closes, more or less or entirely, the vapor-discharge hole in the side of the tube, and thus regulates the discharge by it, and also that of the other discharge, as before stated, and the total quantity of heat produced. The vapor discharges through this hole below the vessel to be heated, so it may be burned and add to the useful work, and avoid escape of unburned vapor. This vapor is made to escape away from plate L, so that it may not receive and transmit its heat back to plate E, to produce vapor, but in such a relation that it may be set on fire by the blaze of the regular jet $v$, to insure burning.

The device of the two discharges for the vapor, both under the vessel to be heated, one connected with a conducting-connection for producing vapor, and the other separate, and one of them regulated by screw, enables the quantity of heat to be regulated very closely, and by very simple and practical means. And the same simple device of parts serves the further purposes of a filling-tube, separate from the regular burner-outlet; and the general arrangement of all the parts produces a most simple and practical apparatus, avoiding former faults.

I claim—

1. The combination, with chamber A, of two vapor-discharges, both under the vessel to be heated, one with a part, L, arranged to receive and transmit heat from its flame to the plate E, to produce vapor, and the other made adjustable and arranged to regulate the quantity of heat produced, substantially as set forth.

2. The combination of the filling-tube and the vapor-escape in one device, and separate and away from the regular burner-outlet, all substantially as set forth.

3. The combination of chamber A, filled with fibrous matter, with a vapor-discharge provided with plate L, having metallic conductors to convey heat from its flame to chamber A for vaporizing, and a vapor-discharge in a filling-tube not so provided, both being below the vessel to be heated, substantially as and for the purposes set forth.

FRANK ROSENGREN.

Witnesses:
SAML. J. WALLACE,
J. K. RODGERS.